United States Patent
Bertrand et al.

(10) Patent No.: US 10,397,634 B2
(45) Date of Patent: Aug. 27, 2019

(54) SYSTEM AND METHOD FOR SYNCHRONIZED PRESENTATION OF VIDEO TIMELINE METADATA

(71) Applicant: SYNAMEDIA LIMITED, Staines Upon Thames (GB)

(72) Inventors: Laurent Bertrand, Middlesex (GB); Pete Rai, Egham (GB); Karel McGrail, Middlesex (GB)

(73) Assignee: SYNAMEDIA LIMITED, Middlesex (GB)

( * ) Notice: Subject to any disclaimer, the term of this patent is extended or adjusted under 35 U.S.C. 154(b) by 505 days.

(21) Appl. No.: 14/224,652

(22) Filed: Mar. 25, 2014

(65) Prior Publication Data

US 2015/0281763 A1    Oct. 1, 2015

(51) Int. Cl.
| | |
|---|---|
| H04N 21/235 | (2011.01) |
| H04N 21/43 | (2011.01) |
| H04N 21/2187 | (2011.01) |
| H04N 21/242 | (2011.01) |
| H04N 21/41 | (2011.01) |
| H04N 21/8358 | (2011.01) |
| H04N 21/2665 | (2011.01) |
| H04N 21/414 | (2011.01) |
| H04N 21/462 | (2011.01) |
| H04N 21/81 | (2011.01) |

(52) U.S. Cl.
CPC ..... *H04N 21/4307* (2013.01); *H04N 21/2187* (2013.01); *H04N 21/235* (2013.01); *H04N 21/2353* (2013.01); *H04N 21/242* (2013.01); *H04N 21/2665* (2013.01); *H04N 21/4122* (2013.01); *H04N 21/41407* (2013.01); *H04N 21/4622* (2013.01); *H04N 21/8133* (2013.01); *H04N 21/8358* (2013.01)

(58) Field of Classification Search
CPC ........................ H04N 21/2353; H04N 21/2187
USPC ..................................................... 725/34, 48
See application file for complete search history.

(56) References Cited

U.S. PATENT DOCUMENTS

| | | | |
|---|---|---|---|
| 5,892,536 A | 4/1999 | Logan et al. | |
| 7,269,842 B1 | 9/2007 | Estipona | |
| 8,676,995 B1* | 3/2014 | Andreasen | H04N 21/4227 340/4.11 |
| 9,009,596 B2* | 4/2015 | Ortiz | G06F 3/01 715/716 |
| 2004/0139047 A1* | 7/2004 | Rechsteiner | G11B 27/034 |
| 2009/0087160 A1 | 4/2009 | Lui et al. | |

(Continued)

FOREIGN PATENT DOCUMENTS

WO    2012154541    11/2012

OTHER PUBLICATIONS

Sean Buckley, "Twitter Wants to Make A 'DVR Mode' for Live TV Events, Offer Delayed Twitter Streams" (AOL 2013).

(Continued)

*Primary Examiner* — Pankaj Kumar
*Assistant Examiner* — Franklin S Andramuno
(74) *Attorney, Agent, or Firm* — Mechant & Gould P.C.

(57) ABSTRACT

In one embodiment, a method for broadcast state agnostic timeline metadata presentation on a companion device is implemented on a computing device and includes: receiving timeline metadata associated with a video content item in a pseudo-live mode, where the timeline metadata is received from a timeline metadata provision system according to a timeline for an original broadcast of the video content item, and presenting the timeline metadata as it is received from said timeline metadata provision system, where the presenting is in parallel to an original or non-original broadcast of the video content item playing on an associated viewing device.

18 Claims, 2 Drawing Sheets

(56) References Cited

U.S. PATENT DOCUMENTS

| | | | | |
|---|---|---|---|---|
| 2010/0017474 | A1* | 1/2010 | Kandekar | H04N 7/17318 709/205 |
| 2011/0320627 | A1 | 12/2011 | Landow et al. | |
| 2012/0011550 | A1 | 1/2012 | Holland | |
| 2012/0210227 | A1* | 8/2012 | Lin | G11B 27/034 715/723 |
| 2013/0074141 | A1* | 3/2013 | Hwang | H04N 21/8126 725/116 |
| 2013/0205338 | A1* | 8/2013 | Sinha | G06T 1/0021 725/34 |
| 2014/0071342 | A1 | 3/2014 | Winograd et al. | |
| 2015/0089372 | A1* | 3/2015 | Mandalia | G11B 27/10 715/720 |
| 2015/0106841 | A1* | 4/2015 | Wolf | H04N 21/812 725/32 |
| 2015/0128179 | A1* | 5/2015 | Cormican | H04N 21/4143 725/38 |

OTHER PUBLICATIONS

James Trew, "Zeebox Update Adds 'Replay Tweets' Feature, Brings Time-Delayed Social Commentary" (AOL 2013).
"Create and Edit Annotations" *You Tube* (Google 2014).
Mar. 24, 2015 Office Communication in connection with EP 15 155 998.6.
Ngoe Q. K. Duong et al., "Fast SEcond Screen TV Synchronization Combining Audio Fingerprint Technique and Generalized Cross Correlation," *2012 IEEE Second Int'l Confrence on Consumer Electronics*, (IEEE 2012).
Kevin Murray et al. "Personalising the Viewer Experience: Enabling Technologies" (IBC 2013 Conference Sep. 2013).
Nicolas Weil, "Synchronized Second-Screen Technologies Panorama" (Nov. 15, 2011) retreived from http //blog.eltrovemo.com/ 529/synchronized-second-screen-technologies-panorama/.
EP Examination Report, dated Dec. 7, 2017, cited in a corresponding application (EP Application No. 15155998.6).
EP Summons to attend oral proceedings pursuant to Rule 115(1) EPC dated Mar. 26, 2019, cited in corresponding application EP 15155998.6; 9 pgs.
Siqui Zhaoet al: Analyzing Twitter for Social TV: Sentiment Extraction for Sports; Proceedings of the 2nd International Workshop on future of Television (FutureTV—2011), Lisbon, Portugal, Jun. 29, 2011, Jul. 1, 2011 (Jul. 1, 2011), XP055055031, Retrieved from the Internet: URL:http://ceur-ws.org/Vol-720/Zhao.pdf [retrieved on Mar. 1, 2013].

\* cited by examiner

SYSTEM AND METHOD FOR SYNCHRONIZED PRESENTATION OF VIDEO TIMELINE METADATA

FIELD OF THE INVENTION

The present invention generally relates to the presentation of timeline metadata in synchronization with associated video.

BACKGROUND OF THE INVENTION

Companion devices such as smartphones, tablets and personal computers have become ubiquitous. One of the many uses of such devices can be to enhance the typical television viewing experience with second screen applications that run in parallel with television content. Such second screen applications generally leverage timeline metadata (also known as intra content metadata) typically generated by third party sources to enhance the experience of viewing the associated principal content while it is presented on a main viewing device such as a television or personal computer.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
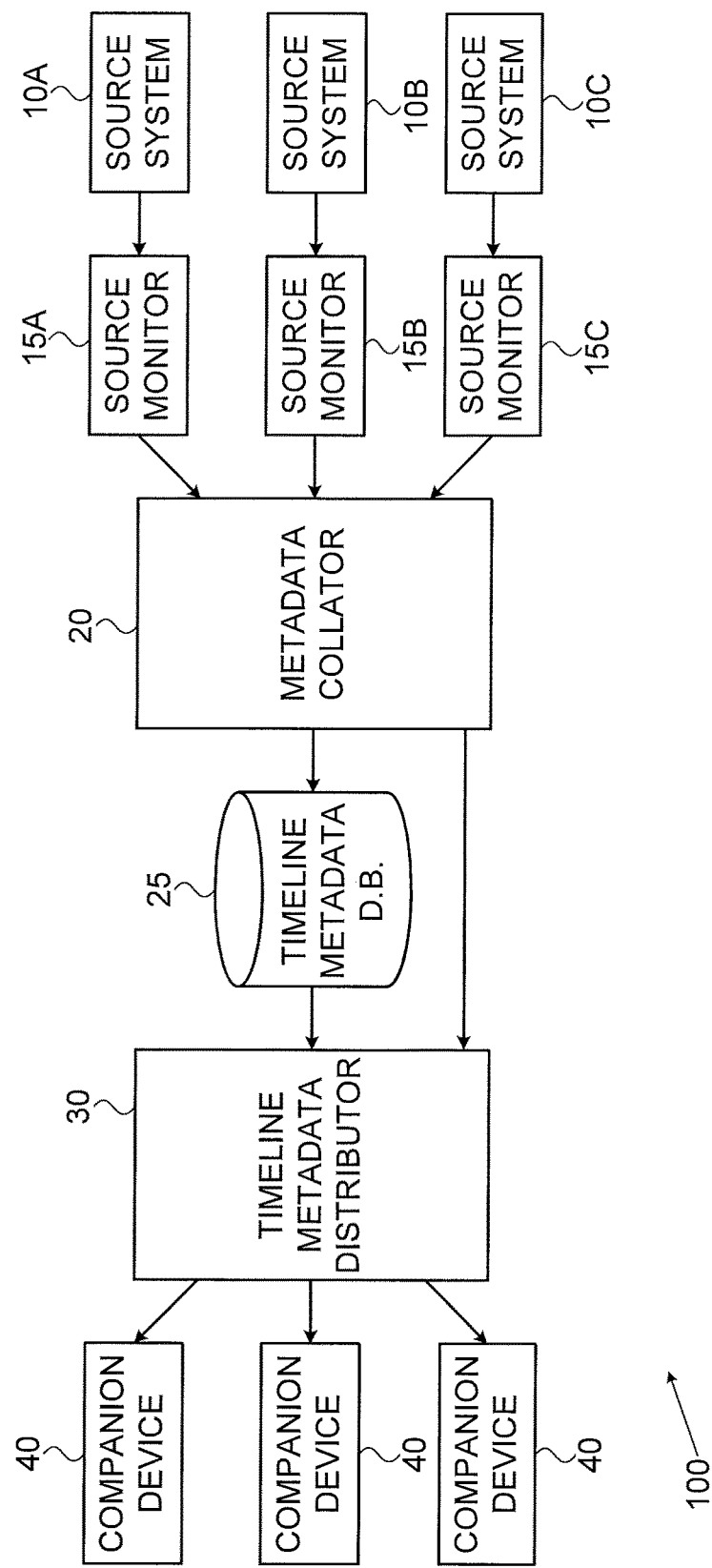
FIG. 1 is a simplified pictorial illustration of a timeline metadata provision system, constructed and operative in accordance with an embodiment of the present invention.

A method for broadcast state agnostic timeline metadata presentation on a companion device is implemented on a computing device and includes: receiving timeline metadata associated with a video content item in a pseudo-live mode, where the timeline metadata is received from a timeline metadata provision system according to a timeline for an original broadcast of the video content item, and presenting the timeline metadata as it is received from said timeline metadata provision system, where the presenting is in parallel to an original or non-original broadcast of the video content item playing on an associated viewing device.

A method implemented on a computing device for providing timeline metadata associated with video content items to a companion device includes: capturing timeline metadata associated with the video content items from original broadcasts of the video content items, storing the timeline metadata according to unique signatures in a timeline metadata database, receiving a real-time request for timeline metadata associated with one of the video content items according to one of the unique signatures from the companion device, where the companion device is implemented on a computing device and operative to present the timeline metadata associated with the video content items, synchronizing a start position in one of the video content items with the companion device, and pushing the timeline metadata associated with one of the unique signatures to the companion device, where: if the unique signature is associated with one of the original broadcasts, the pushing is performed as the timeline metadata becomes available from the capturing, and if the unique signature is associated with a non-original broadcast, the pushing is performed in accordance with a timeline by which the capturing was performed from the one of the original broadcasts.

DETAILED DESCRIPTION OF EXAMPLE EMBODIMENTS

Video content typically includes "broadcast" metadata that may be derived from the audio and/or video signals. Broadcast metadata is included in the video stream broadcast and is usually, although not exclusively, associated with the video content as a whole, for example, providing the title, cast, year of production, etc. of the particular item of video content. Broadcast media is often used to populate electronic program guides (EPGs). "Timeline" metadata is typically provided via other media and is typically associated with a specific facet or point in time of the video content. Non-limiting examples of other media sources for such timeline metadata may be live social feeds, and third party information providers such as those that may provide sports statistics or information related to specific aspects of the video content.

It will be appreciated therefore, that during any given video content broadcast, and particularly "original" broadcasts such as live broadcasts or "debut broadcasts" when the video content is first presented for viewing, there may be numerous items of timeline metadata generated by several disparate sources. Second device applications such as Zeebox® (provided by Zeebox Limited in the U.K.) monitor timeline metadata sources and present the timeline metadata to a viewer as it becomes available. For example, Zeebox provides viewers with tweets from Twitter, additional information opportunities with "Zeetags©" and live stats for sporting events.

Cisco System's Lunar system monitors both current programming on available television channels as well as third party social feeds and live commentary to gather timeline metadata from both the actual broadcast data via analysis as well as directly from the third party sources. The timeline metadata gathered in such manner may subsequently be provided to second device applications or used by electronic program guides (EPGs) and/or recommendation services to provide more accurate services.

It will be appreciated that the timeline metadata generated during live or debut broadcasts may not be readily available when viewing the video content from a recording or from a later broadcast. Furthermore, even if some or all of the timeline metadata may be available, it may be problematic to use without precise synchronization to the video content. For example, when viewing a murder mystery, a viewer may use social media such as Twitter to tweet something like "I can't believe that the butler actually did it!" It will therefore be appreciated that to provide the desired effect, timeline metadata from a previous broadcast must be presented generally along the same timeline as it was generated during the original broadcast.

Reference is now made to FIG. 1 which illustrates a timeline metadata provision system 100, constructed and operative in accordance with an exemplary embodiment of the present invention. System 100 comprises metadata collator 20, timeline metadata database 25 and timeline metadata distributor 30. A multiplicity of source monitors 15 monitor source systems 10 for relevant timeline metadata, typically, although not exclusively, generated by source systems 10 during a broadcast of a given video content item. It will be appreciated that the elements of system 100 may be implemented in one or more suitable computing device such as are known in the art. It will be appreciated therefore, that the individual elements of system 100 may be implemented via various combinations comprises of hardware and software components, such as are well known in the art.

Each source monitor 15 may be configured to detect and receive timeline metadata generated by one or more source systems 10. For example, source system 10A may be a social media application such as Twitter or Facebook. Source monitor 15A may therefore be configured to recognize tweets or posts issued by source system 10A that may be associated with a specific video content item, using publicly available APIs to capture relevant timeline metadata. It will be appreciated that source monitor 15A may use the standard functionality of such social media applications in order to focus on the relevant timeline metadata. For example, source monitor 15A, or some proxy thereof, may join groups, become "friends" or subscribe to feeds that are either directly or indirectly associated with the specific video content item.

It will be appreciated that source systems 10 may not be limited to just social media feeds. Other examples of source systems 10 may include: the EPG provided by the broadcaster of the video content item; third party reference systems such as dictionaries or encyclopedias whose entries may be related to elements of the video content item, for example, an actor or location; and alternate broadcast representations such as online commentaries transmitted in parallel to the broadcast of a video content item such a news story, or an online service providing sports statistics in parallel to the broadcast of a video content item such as a live sportscast. Accordingly, it will be appreciated that in the exemplary embodiment of FIG. 1, source systems 10B and 10C may be any of a wide variety of disparate information systems that may generate timeline metadata associated with a given video content item. It will similarly be appreciated that source monitors 15B and 15C may be configured to detect relevant timeline metadata with the output of source systems 10B and 10C. It will also be appreciated that the depiction of three such source systems 10 may be exemplary; system 100 may be configured to monitor different numbers of source systems 10.

Source monitors 15 may forward timeline metadata to metadata collator 20. Metadata collator 20 may be configured to collate the timeline metadata according individual video content items and/or groups of video content items, for example, timeline metadata for a particular series, or episode of a series. Metadata collator 20 may forward the collated timeline metadata to timeline metadata distributor 30 as it becomes available. Metadata collator 20 may also store some or all of the collated timeline metadata in timeline metadata database 25. It will be appreciated that in addition to timeline metadata, the output of metadata collator 20 may also include some broadcast metadata elements such as, for example, title, genre, director, cast members, etc., which may be used to provide identification and/or context to the timeline metadata.

Timeline metadata distributor 30 may distribute the timeline metadata to individual companion devices 40 as it is received from metadata collator 20. Alternatively, or in parallel, timeline metadata distributor 30 may retrieve the timeline metadata from timeline metadata database 25 at a later point and then distribute it to individual companion devices 40. Companion devices 40 may be any suitable computing devices such as smartphones, tablets, laptops or personal computers that may be configured to present timeline metadata to a viewer, typically while the viewer is viewing the associated video content item on another device such as a television.

It will be appreciated that the functionality of companion device 40 may also be implemented as part of the configuration of the primary media playing device on which the viewer is viewing the associated video content item. For example, when viewing the associated video content item on a television, companion device 40 may be implemented via a split screen, a picture within a picture, or configured to present timeline metadata superimposed over a part of the display screen on which the video content is being displayed. Similarly, when viewing the associated video content item on a computing device with media playing functionality such as, for example, a smartphone, tablet, laptop or personal computer, the functionality of companion device 40 may also be integrated as a component of the same media playing device. It will therefore be appreciated that while the embodiments of the present invention may generally reference companion device 40 as a separate device distinct from the primary media playing device, such references may also be generally applied to an integrated device solution where a single device may provide both media playing and the functionality of companion device 40.

It will be appreciated that timeline metadata distributor 30 may distribute the timeline metadata in response to a request from companion devices 40. Such a request may be a "real-time" request associated with an original broadcast of the associated video content item, where the timeline metadata may be provided in real-time or near real-time as it is generated. It will, however, be appreciated that there may be other modes of operation, for example a "batch" mode using batch requests for timeline metadata that may have been generated and collated in advance of the request. For example, companion device 40 may request the timeline metadata in association with a later broadcast of the video content in which the content broadcaster broadcasts video content that had already been broadcast in the past, e.g. "reruns" or delayed broadcasts that start sometime after the original broadcast. Another instance of a batch mode of operation may be associated with a user initiated playing of a recorded video content item. For example, the viewer may play a commercially distributed DVD of a previously broadcast video content item. Similarly, the viewer may also play a user-recorded version of a video content item that was recorded from a previous broadcast.

There may even be "hybrid" modes of operation where both real-time and batch requests may be relevant. For example, a viewer may begin to view an original broadcast, and then use DVR functionality to pause the broadcast. The DVR may then begin recording the original broadcast, which the viewer may then elect to continue viewing some time later as recorded content. Similarly, by skipping commercials, increasing playback speed, and/or fast-forwarding over other sequences of the recorded content, the recorded content may "catch up" to the original broadcast such that the viewer may once again be viewing the original broadcast.

It will be appreciated that the need to provide for these different modes of operation may increase the complexity of the logic required by companion devices 40 to properly present timeline metadata in association with viewing associated video content items. As will be described hereinbelow, the protocols for requesting the timeline metadata from timeline metadata distributor 30 and the processing logic for presenting it on companion device 40 may be a function of the mode of operation.

By way of illustration, in an exemplary embodiment of the present invention, timeline metadata distributor 30 may be implemented as a web server. Using HTTP, batch requests from companion device 40 may typically be implemented as "GET" requests which may be suitable for "pulling" previously prepared files or information from a web server such as timeline metadata distributor 30. Once received in batch form, the timeline metadata may then require further processing for timeline synchronization vis-à-vis the associated video content item. In contrast, real-time requests, while also issued by companion device 40, may not be implemented as requests to "pull" data from timeline metadata distributor 30, but rather as requests for timeline metadata distributor 30 to "push" data to companion device 40 as it becomes available. Commonly known methods for pushing data from a web server include, for example, long-polling and HTML5 websockets. Since the pulled timeline metadata may be received in real-time or at least near real-time, it may not be necessary for companion device 40 to perform timeline synchronization vis-à-vis the associated video content item; companion device 40 may present the timeline metadata generally as it is received.

It will therefore be appreciated that different protocols and processing logic may be required for receiving and presenting the timeline metadata, depending on the mode of operation. It will further be appreciated that hybrid modes of operation such as described hereinabove may entail more complex processing as both real-time and batch requests may be relevant, and timeline synchronization may or may not be required depending on a current state of operation, The Inventors of the present invention have realized that such complexity may be reduced by providing a single mode of operation on companion devices 40 that may be used to present timeline associated with video content, regardless of the broadcast state of the video content, e.g. original, rerun, recorded, hybrid, etc. As will be described hereinbelow, companion device 40 may be configured to use real-time requests to the general exclusion of batch requests. System 100 may be configured to provide the requested timeline metadata in a "pseudo-live" mode in response to such real-time requests, regardless of whether or not the timeline metadata may be generated based on a live/original broadcast or provided from timeline metadata database 25 after generation based on a previous broadcast. The complexity of operation for companion device 40 may therefore be reduced by configuring timeline metadata distributor 30 to uniformly provide the timeline metadata in a manner consistent with a real-time mode operation on companion device 40.

Figure 2:
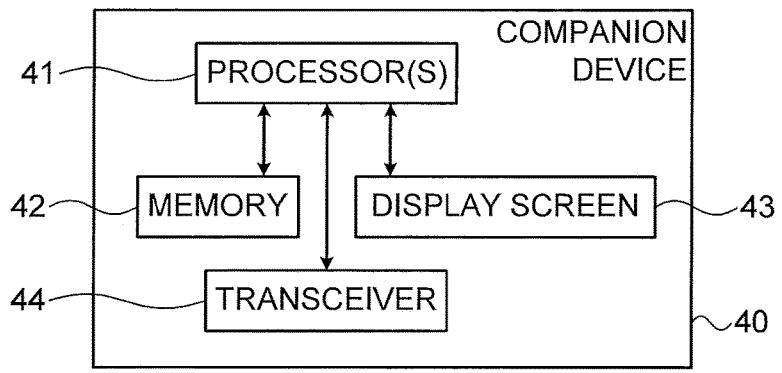
FIG. 2 is a schematic illustration of a companion device for use with the system of FIG. 1.

Reference is now made to FIG. 2 which is a block diagram drawing of an exemplary companion device 40 for use in the system of FIG. 1. Companion device 40 comprises hardware and software components, such as are well-known in the art. Companion device 40 comprises at least one processor 41, non-transitory computer-readable storage media (i.e. memory) 42, screen display 43 and transceiver 44.

It will be appreciated that companion device 40 may comprise more than one processor 41. For example, one such processor 41 may be a special purpose processor operative to present timeline metadata to a viewer, according to a method described herein. Memory 42 may be operative to store instructions, which at least one processor 41 may execute, in order to perform the method of timeline metadata presentation described herein. The timeline metadata may be presented to the viewer on screen display 43 which may typically, although not exclusively, be a touch screen operative to receive additional inputs from the viewer. Transceiver 44 may be operative to use protocols such as are known in the art to provide communications between companion device 40 and at least system 100. In embodiments of the present invention, transceiver 44 may also provide communications with a media presentation device such as a television or set-top box.

Figure 3:
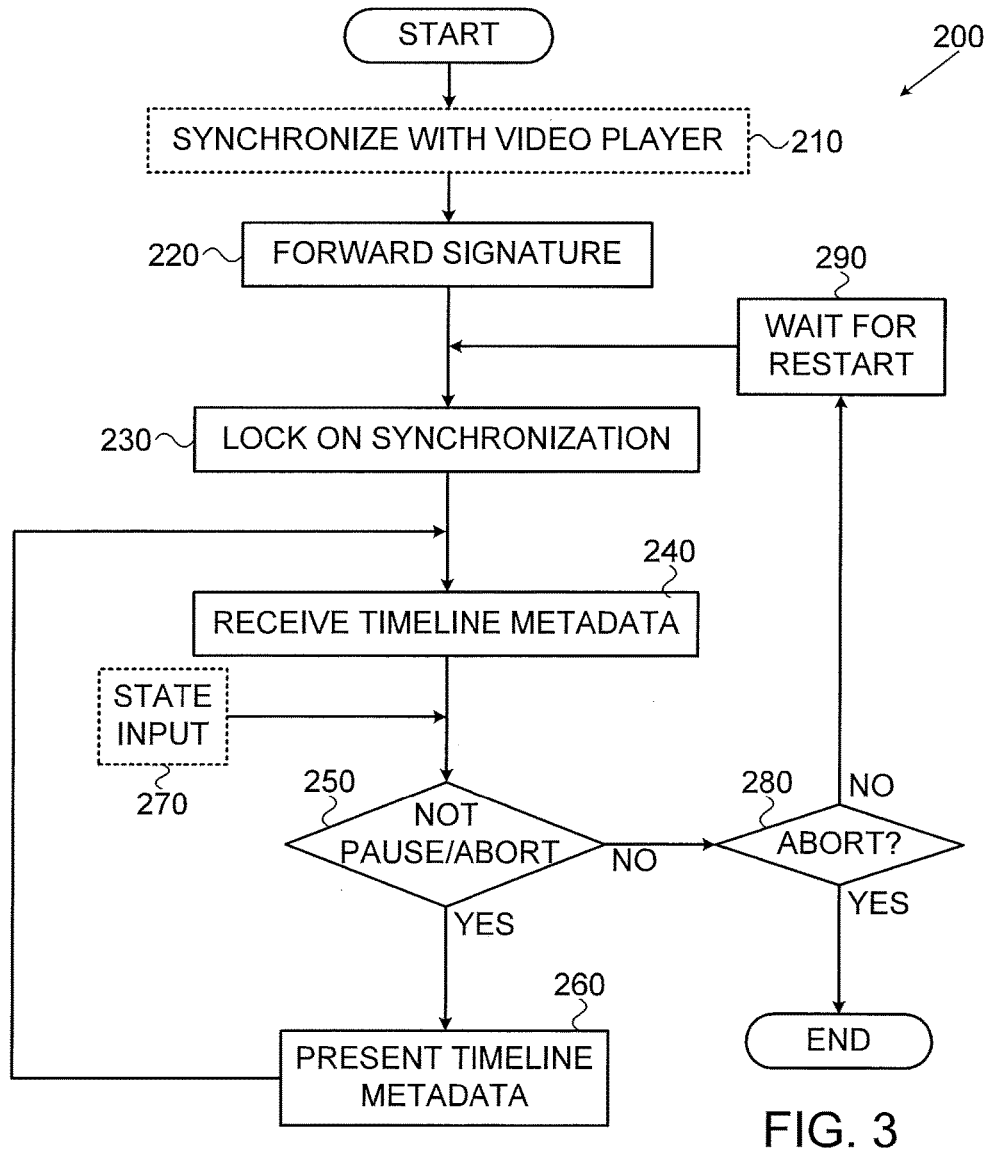
FIG. 3 is a broadcast state agnostic timeline metadata presentation process for execution on the companion device of FIG. 2.

Reference is now made to FIG. 3 which illustrates a broadcast state agnostic timeline metadata presentation process 200 for execution on companion devices 40, constructed and operative in accordance with embodiments of the present invention.

Companion device 40 may synchronize (step 210) the playing of the timeline metadata with the video player on which the associated video content is to be played. For example, companion device 40 may be a tablet and the video player may be a television controlled by a set-top box or DVR. Companion device 40 may use any suitable technology such as for example WiFi connectivity, Bluetooth, or a wired connection to directly connect with the video player via a home network to perform the synchronization. In such cases, companion device 40 may be configured to control the video player. Alternatively, companion device 40 may synchronize indirectly by accessing the EPG provided by the broadcaster of the video content item that is to be played on the video player.

Companion device 40 may forward (step 220) a real-time request to timeline metadata distributor 30 (FIG. 1) for timeline metadata associated with the video content item. The real-time request may be implemented, for example, using HTML5 websockets, and may comprise a unique signature associated with the video content item. It will be appreciated that as described herein, companion device 40 may send a real-time request regardless of whether or not the requested timeline metadata is associated with a live or debut broadcast of the video content item.

The unique signature may be derived, for example, according to metadata in an EPG entry or the title of a DVD. It will be appreciated that companion device 40 may be configured with a user interface for selecting an exact unique signature from an online list accessible either directly or indirectly via system 100. For example, if a viewer may request the movie "The Three Musketeers," it may be necessary to further indicate whether the request is for the 1993 version or the 2011 version.

Companion device 40 may then lock on (step 230) to synchronize its internal time clock for the video content item with that of system 100 in order to facilitate the presentation of the timeline metadata as per its original timeline. It will be appreciated that timeline metadata distributor 30 (FIG. 2) may be configured with suitable functionality to facilitate such synchronization for each connected companion device 40.

Companion device 40 may then receive (step 240) the associated timeline metadata from timeline metadata distributor 30. It will be appreciated that timeline metadata distributor 30 may be configured to use the unique signature to determine whether or not the video content item to be viewed on the video player is currently being broadcast live. For example, timeline metadata distributor 30 may use the unique signature to determine whether an entry for the video content item already exists in timeline metadata database 25. Alternatively or additionally, timeline metadata distributor 30 may search a broadcaster's EPG to find a current broadcast.

If the video content item is being broadcast live, timeline metadata distributor 30 may forward the timeline metadata to companion device(s) 40 generally as it may be received from metadata collator 20. If the video content item is a rerun or delayed broadcast, or even a paused broadcast of a live broadcast as will be discussed hereinbelow, timeline metadata distributor 30 may retrieve the associated timeline metadata from timeline metadata database and then transmit it to companion device 40 according to the original timeline of its generation.

In either case, i.e. whether the broadcast is "live" or "rerun/delay", timeline metadata distributor 30 may push the timeline metadata to companion device 40 in a pseudo-live mode, for example, using websockets, such that the timeline metadata may arrive generally as per the current timeline of the video content item as it may be viewed. It will be appreciated that timeline metadata distributor 30 may comprise the functionality required to keep track of the current time as maintained by the internal clock on companion device 40, per at least the synchronization performed in step 230, It will therefore be appreciated that there may be no explicit indication to companion device 40 whether the timeline metadata being received is sourced from the current broadcast, i.e. it is "live data", or recorded during a previous broadcast. Accordingly, as long as process 200 is not in a pause or abort state (step 250), companion device 40 may present (260) the timeline metadata generally as soon as it is received. If the timeline metadata is live data from an original broadcast, it may therefore be generally presented as per the timeline in which it is generated. If the video content being played is not an original broadcast, timeline metadata distributor 30 may be tasked with the responsibility of ensuring that the timeline metadata is transmitted to companion device 40 according to its original timeline; in this respect, companion device 40 may be fully agnostic with regard to the state of the timeline, i.e. either live or recorded. Control may then loop back to step 240.

It will be appreciated that the viewer may pause or abort the playing of the video content. Companion device 40 may be configured to receive (step 270) "state input" indicating a change in state for process 200, for example, from "playing" to "pause", or from playing to "abort". It will be appreciated that depending on the configuration of companion device 40, such input may be relayed from the video player, or input directly via a user interface on companion device 40. Companion device 40 may also be configured to autonomously change to an "abort" state upon the completion of the playing of the video content item.

As described hereinabove, pausing play may be indicative of a hybrid mode of operation where the initial request from companion device 40 was for the provision of timeline metadata from a live/original broadcast, whereas once play resumes, "non-live" timeline metadata may be requested. It will be appreciated that as described hereinabove, timeline metadata distributor 30 may be configured to provide such non-live" timeline metadata in response to real-time requests. Accordingly, companion device 40 may continue to use real-time requests regardless of the actual state of the hybrid mode of operation.

Once it is determined that companion device 40 is in a pause or abort state (step 250), if the state is "abort" (step 280), process 200 may end. Otherwise, process 200 may enter a wait state, i.e., wait (step 290) for restart input. It will be appreciated that such a wait state may be occasioned by more than one possible scenario. For example, if the video content item is an original broadcast, pausing the playing to enter the wait state may indicate that the viewer has elected to pause the playing of the video content as it is received and instead store data in a buffer as it arrives. It may also indicate that the viewer wishes to continue viewing the video content without pause, but has decided for whatever reason to pause the presentation of the timeline metadata. In another scenario, the video content item may be a recorded program. But in any case, the timeline metadata may be presented along the same basic timeline according to which it is received. Accordingly, the operation of process 200 may be generally be considered state agnostic.

When an indication is received to restart the process in step 290, control may be restored to step 230 to enable companion device 40 to resynchronize with system 100 before continuing process 200 as before.

It will be appreciated that depending on the level of direct synchronization possible between the video player and companion device 40, step 210 may also be repeated prior to continuing with step 230. This may, for example, facilitate the scenario in which the viewer continued viewing the video content item on the video player but, for whatever reason, paused the presentation of timeline metadata on companion device 40. In such a case, companion device 40 will be updated regarding the current point being played in the video content item, and will use that as a basis for lock on synchronization in step 230. It will be appreciated that in other scenarios rerunning step 210 may not have an appreciable impact.

It will also be appreciated that other states may be input during step 270. For example, when viewing a recorded video content item, companion device 40 may be configured to receive indications of fast-forward and/or rewind states. In such cases, process 200 may proceed to step 290 and wait until an indication is received that the fast-forward/rewind has finished. Once such an indication may be received in step 290, process 200 may continue with either step 230 or step 210 as described herein above. It will be appreciated that processing a fast-forward state in such manner may facilitate a hybrid mode of operation wherein a once paused broadcast may "catch up" to a live/original broadcast and begin to receive timeline metadata in real-time or near real-time. It will however be appreciated that for such a scenario to be practical, companion 40 should be configured to communicate directly with the primary media playing device in order to synchronize the timeline after the execution of the fast-forward or rewind on the primary media playing device.

It will be appreciated that in some embodiments of the present invention, companion device 40 may run process 200 independently of actually playing the video content item. In such scenario, process 200 may begin with step 220 to facilitate using companion device 40 to view the timeline metadata associated with a given video content item without actually viewing the associated video content item.

It will be appreciated therefore, that companion device 40 may be configured to receive state commands such as pause, fast-forward and rewind, independent of the playing of the associated video content item. In some embodiments of the present invention, where companion device 40 may nevertheless be in direct communication with the primary media playing device, this functionality may be leveraged to enable a user to request to play the video content item from a current point in the timeline metadata as played on companion device 40.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for presenting timeline metadata on a companion device, wherein said companion device is implemented on a computing device and said timeline metadata is associated with video content items, the method comprising:
    forwarding a unique signature to a timeline metadata provision system, said unique signature uniquely identifying one of said video content items, wherein said timeline metadata provision system is operative to capture timeline metadata associated with said video content items;
    synchronizing a start position in said one of said video content items with a start position in a timeline provided by a timeline metadata distributor in said timeline metadata provision system, wherein said timeline is associated with said one of said video content items;
    receiving timeline metadata from said timeline metadata distributor according to said timeline, wherein said timeline metadata is associated with said one of said content items according to said unique signature wherein said timeline metadata is received in response to said timeline metadata distributor pushing said timeline metadata to said companion device in a pseudo-live mode using websockets such that said timeline metadata arrives as per a current timeline of the video content item as it is being viewed and based on said timeline metadata distributor's knowledge of a state of an internal clock of said companion device obtained during synchronizing; and
    presenting said timeline metadata on a display of said companion device as it is received from said timeline metadata distributor, wherein said timeline metadata received from said timeline metadata distributor was generated according to said timeline in response to at least one of a current broadcast of said one of said video content items, or a previous broadcast of said one of said video content items.

2. The method according to claim 1 and wherein said presenting is performed in parallel to said one of said video content items being played on a video playing device.

3. The method according to claim 2 and also comprising synchronizing said start position with a start position in said one of said video content items being played on said video playing device.

4. The method according to claim 1 and also comprising:
    receiving a request to pause said presenting;
    pausing said presenting;
    receiving a request to restart said presenting;
    synchronizing a new start position in said one of said video content items with a timeline provided by said timeline metadata provision system; and
    performing said presenting.

5. The method according to claim 4 and also comprising synchronizing said new start position with a new start position in said one of said video content items being played on said video playing device.

6. The method according to claim 2 and wherein said companion device is integrated into said video playing device.

7. The method according to claim 2 and wherein a start position for said playing on said video playing device may be determined in accordance with a current position in said presenting on said companion device.

8. The method according to claim 1 and wherein said forwarding comprises sending a real-time request to said timeline metadata provision system.

9. The method according to claim 8 and wherein said real-time request is an HTML5 websockets request.

10. A method implemented on a computing device for providing timeline metadata associated with video content items to a companion device, the method comprising:
    capturing timeline metadata associated with said video content items from original broadcasts of said video content items;
    storing said timeline metadata according to unique signatures in a timeline metadata database, each of said unique signatures uniquely identifying one of said video content items;
    receiving a real-time request for timeline metadata associated with one of said video content items according to one of said unique signatures from said companion device, wherein said companion device is implemented on a computing device and operative to present said timeline metadata associated with said video content items;
    synchronizing a start position in said one of said video content items with said companion device; and
    pushing said timeline metadata associated with said one of said unique signatures to said companion device wherein pushing said timeline metadata comprises pushing said timeline metadata to said companion device in a pseudo-live mode using websockets such that said timeline metadata arrives as per a current timeline of the video content item as it is being viewed and based on knowledge of a state of an internal clock of said companion device obtained during synchronizing, wherein:
        upon determining that said unique signature is associated with one of said original broadcasts, said pushing is performed as said timeline metadata becomes available from said capturing, and
        upon determining that said unique signature is associated with a non-original broadcast, said pushing is performed in accordance with a timeline by which said capturing was performed from said one of said original broadcasts.

11. The method according to claim 10 and wherein:
    upon determining that said unique signature is associated with a non-original broadcast, said pushing comprises retrieving said timeline metadata from said timeline metadata database.

12. The method according to claim 10 and also comprising:
pausing said pushing in response to a request from said companion device to pause;
receiving a request from said companion device to restart said pushing;
synchronizing a new start position in said one of said video content items with said companion device; and
pushing said timeline metadata associated with said one of said unique signatures from said timeline metadata database to said companion device, wherein said pushing starts in accordance with said new start position relative to said timeline by which said capturing was performed from said original broadcasts.

13. The method according to claim 12 and also comprising:
detecting that said new start position is not associated with a live broadcast; and
performing said pushing from said timeline metadata database.

14. The method according to claim 10 and also comprising:
receiving a request from said companion device to synchronize a new said start position;
synchronizing a new said start position;
upon determining that said new start position is consistent with a current position in a current said original broadcast of said video content item associated with said unique signature, performing said pushing as said timeline metadata becomes available from said capturing; and
upon determining that said new start position is inconsistent with a current position in a current said original broadcast of said video content item associated with said unique signature, performing said pushing in accordance with a timeline by which said capturing was performed from said one of said original broadcasts.

15. The method according to claim 14 and wherein said request from said companion device to synchronize represents one of the following operations performed on said timeline metadata on said companion device: rewind, fast-play, or fast-forward.

16. The method according to claim 10 and wherein said companion device is operative to present said timeline metadata in synchronization with the playing of said associated video content items.

17. The method according to claim 16 wherein said playing is performed on a video playing device.

18. The method according to claim 10 and wherein said real-time request is an HTML5 websockets request.

* * * * *